(12) United States Patent
Sayenko (10) Patent No.: US 7,970,004 B2
(45) Date of Patent: Jun. 28, 2011

(54) METHOD AND SYSTEM FOR PROVIDING MULTICAST CONTENTION RESOLUTION

(75) Inventor: Alexander Sayenko, Espoo (FI)

(73) Assignee: Nokia Corporation, Espoo (FI)

( * ) Notice: Subject to any disclaimer, the term of this patent is extended or adjusted under 35 U.S.C. 154(b) by 275 days.

(21) Appl. No.: 12/024,733

(22) Filed: Feb. 1, 2008

(65) Prior Publication Data

US 2009/0196304 A1    Aug. 6, 2009

(51) Int. Cl.
*H04L 12/413* (2006.01)

(52) U.S. Cl. ........ 370/447; 370/312; 370/346; 370/432; 370/449; 709/226

(58) Field of Classification Search .................. 370/346, 370/445, 447, 449, 312, 432, 310, 322, 348, 370/414, 416, 418; 709/226, 232, 233
See application file for complete search history.

(56) References Cited

U.S. PATENT DOCUMENTS

| | | | | |
|---|---|---|---|---|
| 2002/0080816 A1* | 6/2002 | Spinar et al. | ................. | 370/449 |
| 2006/0153132 A1* | 7/2006 | Saito | ............................. | 370/346 |
| 2007/0165666 A1* | 7/2007 | Lifshitz et al. | ................ | 370/445 |
| 2008/0170521 A1* | 7/2008 | Govindan et al. | ............. | 370/310 |
| 2009/0161591 A1* | 6/2009 | Ahmadi et al. | ............... | 370/312 |

OTHER PUBLICATIONS

Alanen, O. 2007. Multicast polling and efficient voip connections in ieee 802.16 networks. In Proceedings of the 10th ACM Symposium on Modeling, Analysis, and Simulation of Wireless and Mobile Systems (Chania, Crete Island, Greece, Oct. 22-26, 2007). MSWiM '07. ACM, New York, NY, 289-295. DOI= http://doi.acm.org/10.1145/1298126.1298177.*

Lidong Lin; Weijia Jia; Wenyan Lu, "Performance Analysis of IEEE 802.16 Multicast and Broadcast Polling based Bandwidth Request," Wireless Communications and Networking Conference, 2007.WCNC 2007. IEEE , vol., No., pp. 1854-1859, Mar. 11-15, 2007.*

Sayenko, A.; Alanen, O.; Hamalainen, T., "On Contention Resolution Parameters for the IEEE 802.16 Base Station," Global Telecommunications Conference, 2007. GLOBECOM '07. IEEE , vol., No., pp. 4957-4962, Nov. 26-30, 2007.*

Sayenko, A.; Alanen, O.; Hamalainen, T., "Adaptive Contention Resolution for VoIP Services in the IEEE 802.16 Networks," World of Wireless, Mobile and Multimedia Networks, 2007. WoWMoM 2007. IEEE International Symposium on a , vol., No., pp. 1-7, Jun. 18-21, 2007.*

* cited by examiner

*Primary Examiner* — Kwang B Yao
*Assistant Examiner* — Jeffrey M Rutkowski
(74) *Attorney, Agent, or Firm* — Ditthavong Mori & Steiner, P.C.

(57) ABSTRACT

An approach is provided for providing contention resolution for resources of a network. Individual contention resolution parameters are determined for respective multicast groups of terminals. The terminals within each of multicast groups able to perform contention resolution over a contention channel based on the respective individual contention resolution parameters.

13 Claims, 8 Drawing Sheets

FIG. 7B

METHOD AND SYSTEM FOR PROVIDING MULTICAST CONTENTION RESOLUTION

BACKGROUND

Radio communication systems, such as wireless data networks (e.g., WiMAX (Worldwide Interoperability for Microwave Access) systems, DVB (Digital Video Broadcasting)-H (Handheld) systems, and spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves contention resolution for resource allocation among the many mobile stations. Ineffective contention resolution mechanisms can result in poor network performance, not to mention waste of network resources.

Some Exemplary Embodiments

There is therefore a need for an approach for providing efficient contention resolution, which can co-exist with already developed standards and protocols.

According to one embodiment of the invention, a method comprises creating a plurality of multicast groups of terminals for providing contention resolution for resources of a network. The method also comprises determining individual contention resolution parameters for respective multicast groups of terminals, wherein the corresponding terminals within each of the multicast groups is configured to perform contention resolution over a contention channel based on the respective individual contention resolution parameters.

According to another embodiment of the invention, an apparatus comprises a contention resolution logic to create a plurality of multicast groups of terminals for providing contention resolution for resources of a network. The contention resolution logic determines individual contention resolution parameters for respective multicast groups of terminals. The corresponding terminals within each of the multicast groups can perform contention resolution over a contention channel based on the respective individual contention resolution parameters.

According to another embodiment of the invention, a method comprises receiving a contention resolution parameter assigned to one of a plurality of multicast groups of terminals for providing contention resolution for resources of a network. The method also comprises performing contention resolution over a contention channel based on the contention resolution parameter. The contention resolution parameter is among a plurality of contention resolution parameters assigned to respective multicast groups of terminals.

According to yet an exemplary embodiment, an apparatus comprises a contention resolution logic to receive a contention resolution parameter assigned to one of a plurality of multicast groups of terminals for providing contention resolution for resources of a network. The contention resolution logic performs contention resolution over a contention channel based on the contention resolution parameter. The contention resolution parameter is among a plurality of contention resolution parameters assigned to respective multicast groups of terminals.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF PREFERRED EMBODIMENT

An apparatus, method, and software for providing an efficient contention resolution in a multicast environment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to multicast services using a WiMAX (Worldwide Interoperability for Microwave Access) technology, it is recognized by one of ordinary skill in the art that the embodiments of the inventions have applicability to any type of communication services and equivalent technologies.

Figure 1:
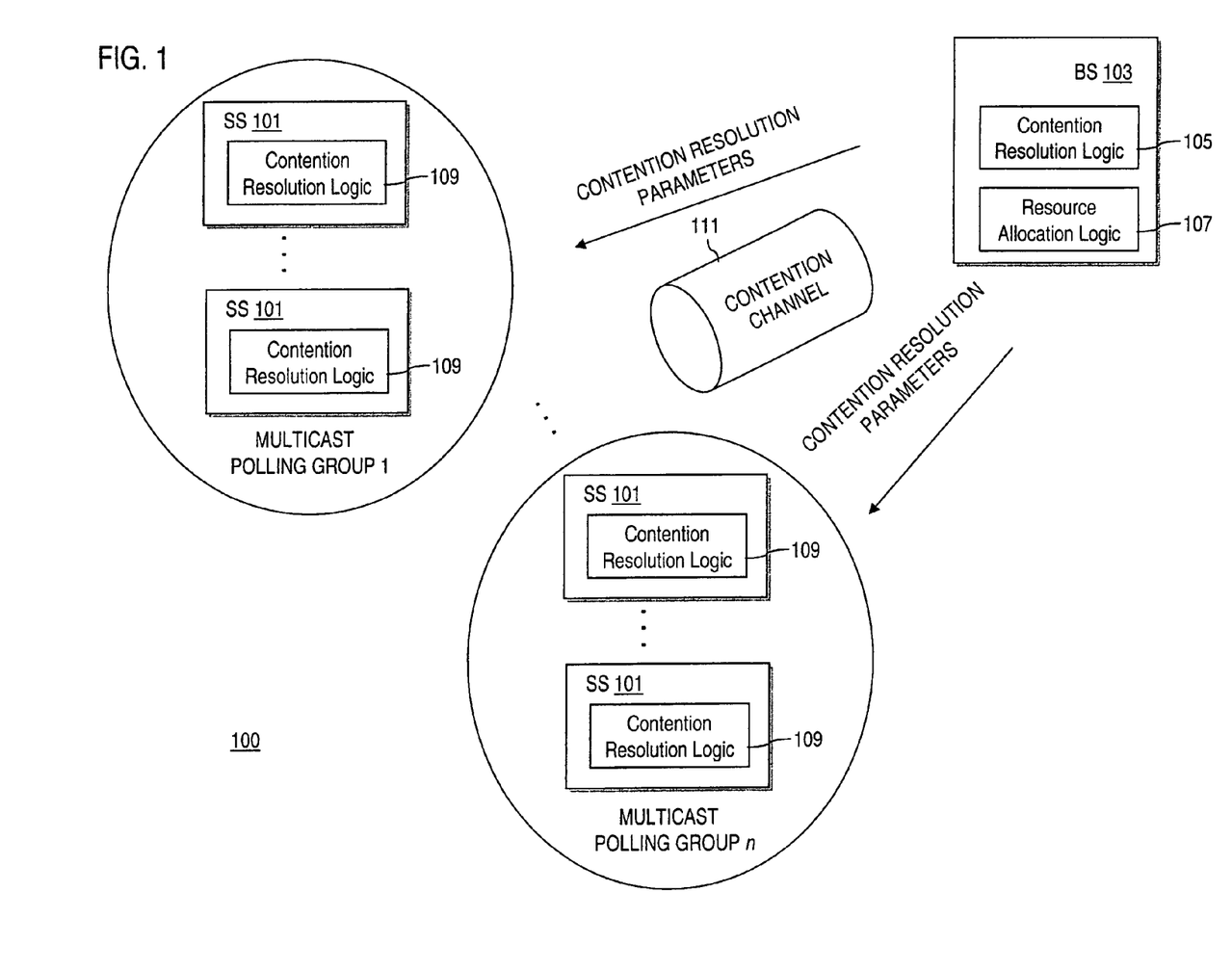
FIG. 1 is a diagram of a communication system capable of providing a multicast contention resolution mechanism, according to an exemplary embodiment.

FIG. 1 is a diagram of a communication system capable of providing a multicast contention resolution mechanism, according to an exemplary embodiment. A communication system 100 includes for one or more subscriber stations 101 and one or more base stations 103 for serving these subscriber stations 101. According to one embodiment, the base station 103 is part of an access network (e.g., 3GPP LTE (or E-UTRAN or 3.9G), WiMAX (Worldwide Interoperability for Microwave Access), etc.); such an access network is further detailed in FIGS. 7A and 7B. The subscriber stations 101 may be any type of mobile stations (MS) or user equipment, such as handsets, terminals, stations, units, devices, or any type of interface to the user (such as "wearable" circuitry, etc.). The base station 103 serves the subscriber stations 101 and is configured to allocate resources, via a resource allocation logic 105, associated with communication links (e.g., downlink and/or uplink) for these SSs 101.

Under this scenario, the subscriber stations 101 are organized in different multicast polling groups 1 . . . n as to divide the collision domains for a more efficient multicast contention resolution mechanism. This mechanism is executed by the contention resolution logic 105, 109 within the BS 103 and the SSs 101, respectively, to secure network resources by the SSs 101. These SSs 101 utilize a contention channel 111 to convey network resource requests to the BS 103. In other words, the system 100 provides contention resolution, whereby subscriber stations (SSs) 101 can send bandwidth requests over the contention channel 111 to the base station (BS) 103 without being polled.

To better appreciate the multicast contention resolution mechanism utilized in the system 100, it is instructive to describe the operation of a contention resolution scheme, in general. With contention resolution, because the SSs 101 randomly choose a transmission opportunity, two or more SSs 101 can transmit during the same time. However, there is a non-zero probability that a collision can occur between multiple SSs 101 seeking to communicate concurrently. That is, collisions can occur even though the probability is minute. As a result, the BS 103 may not correctly receive the bandwidth request, and the SSs 101 are required to perform the contention resolution once again.

Such an approach is necessary for several WiMAX scheduling classes, such as non-real-time Polling Service (nrtPS) and best effort (BE), which are either polled irregularly or not polled at all. The contention resolution can also be used by extended real-time Polling Service (ertPS) connections that support Voice over Internet Protocol (VoIP) services. It is noted that polling requires a non-trivial number of slots. If the BS 103 seeks to poll an SS 101, the BS 103 has to allocate at least one slot. However, if an SS 101 does not have data to send, then resources are wasted. Consequently, contention resolution provides an efficient mechanism for resource allocation; in this manner, the SS 101 requests resources when the SS 101 has data that requires transport.

According to certain embodiments, parameters of the contention resolution mechanism include a backoff start value, a backoff end value, and a number of the request transmission opportunities. The backoff start value determines the initial backoff window size, from which an SS 101 randomly selects a number of the transmission opportunities to defer before sending the bandwidth request. If the transmission fails, the backoff window is increased and the contention resolution is repeated. The SS 101 continues to retransmit the bandwidth request until the backoff window reaches the backoff end value. When the number of retries expires, an SS 101 drops a service data unit (SDU) (not shown) to send and start the contention resolution from the beginning for a next SDU, if any.

In an exemplary embodiment, the system 100 utilizes a multicast polling scheme whereby the SS 101 sends a bandwidth request, not during common request contention slots, but rather during slots assigned by the BS 103, which utilizes a contention resolution logic 105 to determine individual contention resolution pararmeters for particular multicast groups of SSs 101. In other words, the multicast polling scheme permits only a certain set of SSs 101 (i.e., depending on their membership in the multicast groups) to use the allocated slots. Hence, the system 100 partitions the collision domains, which can improve network performance by reducing the number of stations in contention at anyone time. By splitting one collision domain into several ones, the performance of a certain group of SSs 101 can be optimized.

As mentioned, the contention resolution mechanism is controlled by the following contention resolution parameters: a backoff start value, a backoff end value, and the number of the request transmission opportunities. In an exemplary embodiment, the backoff start/end values can be announced in an Uplink Channel Descriptor (UCD) message, and the information regarding the number of transmission opportunities can be specified in an uplink map (UL-MAP) message.

With multicast polling, each group has an individual number of the transmission opportunities, which is announced through the same UL-MAP message by using a multicast group connection identifier (CID) (not shown). Thus, all the multicast groups including the common request contention resolution rely upon their respective backoff start/end values. Under this approach, resource allocation can be performed efficiently.

For the purposes of illustration, the system of FIG. 1 supports a VoIP service (e.g., ertPS connections) as well as best effort (BE) service. The BE connections are established using the contention resolution mechanism; although the system 100 can poll the ertPS connections when VoIP codec is in the silence phase, better resource utilization can be achieved if the ertPS connections requests the BS 103 to allocate resources through the contention resolution mechanism when the active phase starts. The specification allows the ertPS connection to take part in the contention resolution. As both the BE and ertPS connections start to use the same transmission opportunities, they may experience poor performance. Thus, the approach, according to certain embodiments, groups the ertPS connections into a separate multicast polling group so that it does not collide with the BE connections. However, the ertPS connections will still use the common backoff start/end values while performing the contention resolution. The problem is that backoff start/end parameters can be quite different for the user datagram protocol (UDP) based VoIP service and some Transmission Control Protocol (TCP) based BE applications, such as Web browsing. While the VoIP service can tolerate packet drops, backoff start/end values are chosen so that either the SS 101 tries to transmit the bandwidth request within the required interval or drops a VoIP packet. This can be achieved by selecting the backoff start and end values that are either identical or very close one to each other. It is noted that preserving the timing requirements of the interactive VoIP applications can improve performance.

Conversely, TCP applications are very sensitive to packet drops. Thus, their common setting is to have a larger "distance" between the backoff start and end values so that an SS 101 execute several retries during the contention resolution procedure. As follows from that example, the BS 103 can announce independent contention resolution parameters (e.g., backoff start/end values) for each multicast group. Without this separate treatment, either the VoIP service or the BE service will be poor.

Figure 2:
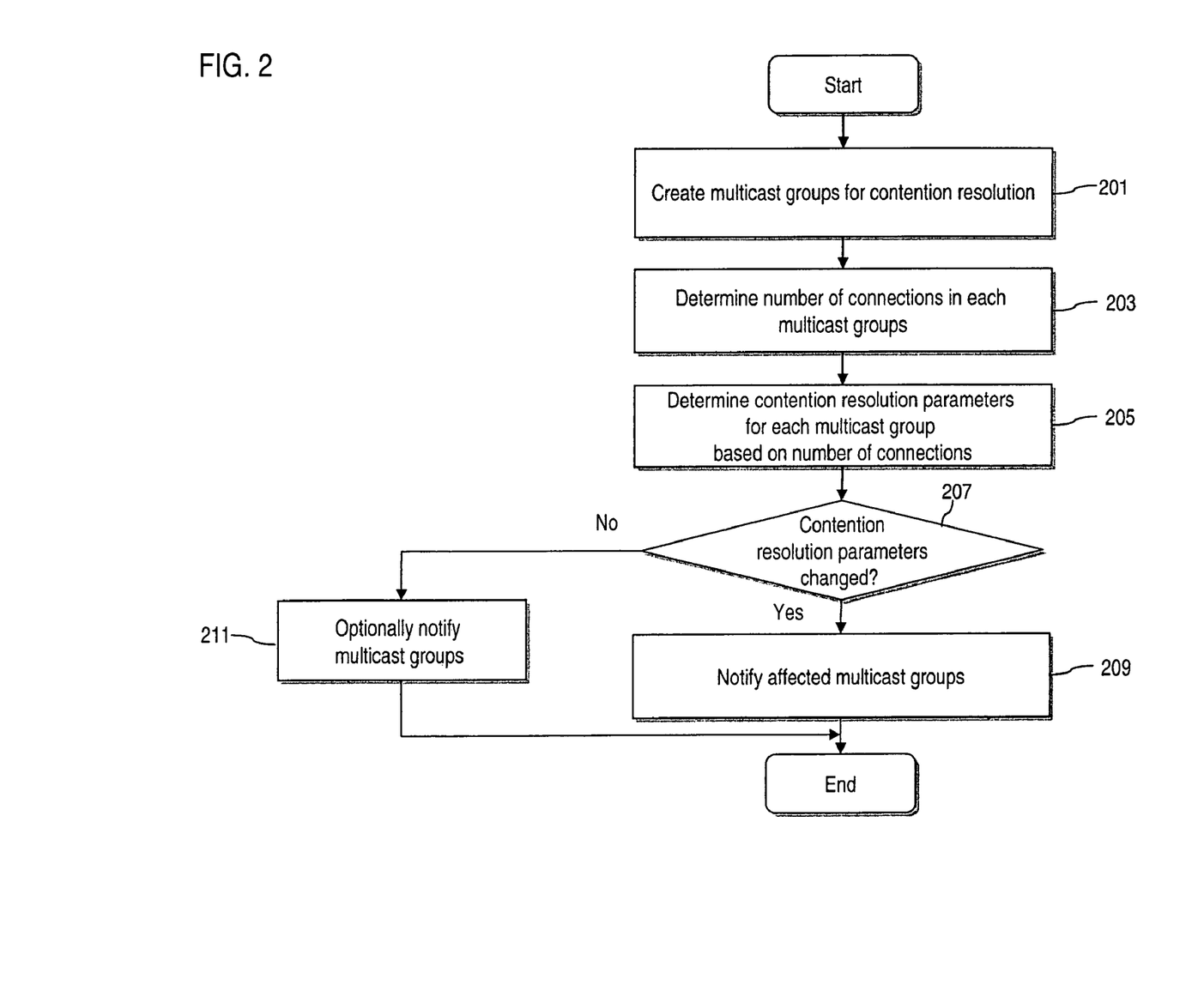
FIG. 2 is a flowchart of a process for transmitting contention resolution parameters to corresponding multicast groups, according to an exemplary embodiment.

FIG. 2 is a flowchart of a process for transmitting contention resolution parameters to corresponding multicast groups, according to an exemplary embodiment. In step 201, multicast groups of terminals (e.g., subscriber stations 101) are created, which can be based on the type of communication service, class of service, quality of service, etc. The process determines, per step 203, the number of connections within each of the multicast groups. In step 205, the contention resolution parameters (e.g., backoff start value, backoff end value, number of transmission opportunities, etc.) are determined for each of the separate multicast groups based on the determined number of connections. To further enhance efficiency of this procedure, the process can elect to send only contention resolution parameters that have changed (as it is conceivable that the parameters remain valid despite the change in conditions). Accordingly, in step 207, the process determines whether the contention resolution parameters are new—i.e., have changed—for the particular multicast groups. This determination can be performed by maintaining a table of previous values for the contention resolution parameters, whereby the latest contention resolution parameters are compared against the corresponding table entries. In step 209, only the affected multicast groups will be provided with the contention resolution parameters. However, if the determination in step 207 results in no changes, the process nevertheless can notify the terminals within the multicast groups (step 211).

As evident from the above process, the BS 103 announces individual backoff start and end values for each multicast polling group to optimize performance and achieve more flexible resource allocation.

Figure 3:
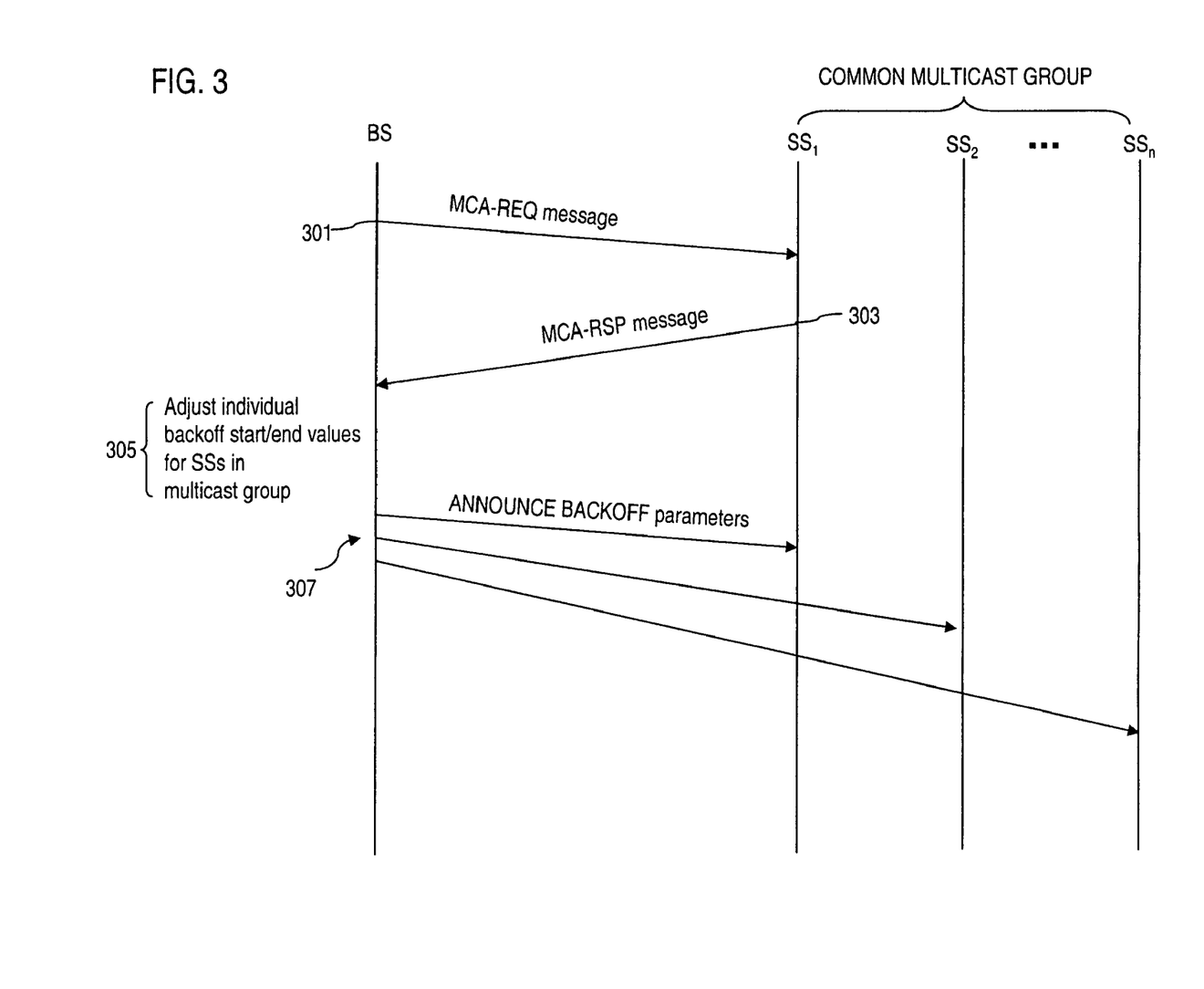
FIG. 3 is a diagram of a process for adding a subscriber station to a multicast group for receiving contention resolution parameters, according to an exemplary embodiment.

FIG. 3 is a diagram of a process for adding a subscriber station to a multicast group for receiving contention resolution parameters, according to an exemplary embodiment. As shown, if the BS 103 wants to add an SS 101 to a particular multicast polling group, the BS 103 sends a multicast assignment message request (MCA-REQ) message, as in step 301, to a required SS 101 with the desired multicast polling group identifier (ID). If the SS 101 is capable of participating in the contention resolution during the multicast polling slots (and wants to be added to a group), the SS 101 responds with a multicast assignment message response MCA-RSP message, per step 303.

In step 305, the BS 103, with its knowledge of the number of connections in each group, can adjust individually the contention resolution parameters (e.g., backoff start/end values) for each multicast group. The BS 103 can use the multicast group connection ID (CID) to announce parameters related to a particular multicast group. It noted that the announcement itself can be transmitted over a broadcast CID for receipt by all SSs 101 (step 307).

To increase the probability of the successful transmission, the BS 103 can, according to one embodiment, adapt the backoff start/end values and the number of the transmission opportunities to the varying network conditions.

Figure 4:
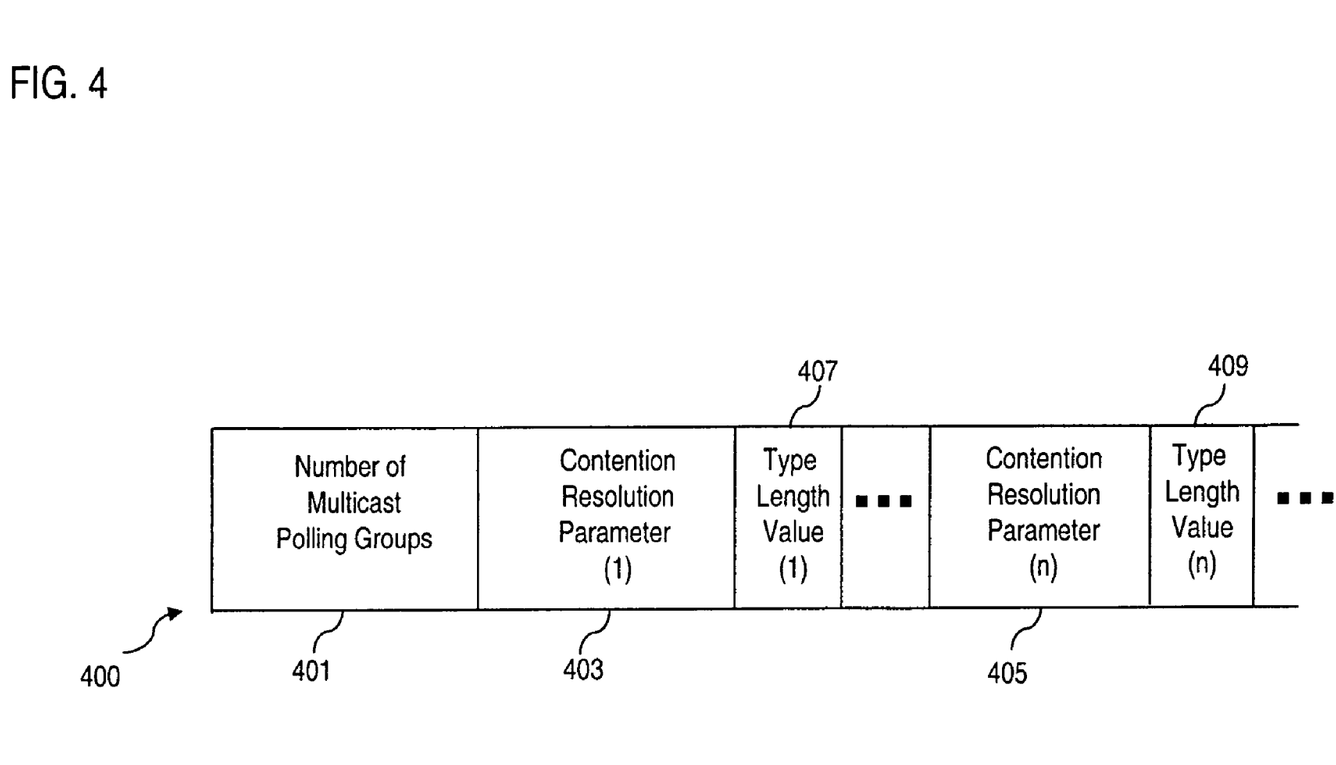
FIG. 4 is a diagram of a message structure for conveying contention resolution parameters to multicast groups, according to an exemplary embodiment.

An exemplary message structure for announcing the configuration information to one or several multicast groups is explained with respect to FIG. 4.

FIG. 4 is a diagram of a message structure for conveying contention resolution parameters to multicast groups, according to an exemplary embodiment. An announcement message 400 includes a field 401 that specifies the number of multicast polling groups followed by fields 403 and 405 associated with the contention resolution parameters corresponding to the multicast polling groups (1 . . . n) identified in the field 401. The contention resolution parameter fields 403 and 405 are each followed by type length value (TLV) fields 407 and 409. Table 1, below, provides a description of these fields:

TABLE 1

| Syntax | Size | Notes |
| --- | --- | --- |
| Number of groups | 8 bits | Number of the multicast groups |
| for (i=0; i<number of groups; i++) { | | |
|   Backoff start | 8 bits | Multicast group backoff start |
|   Backoff end | 8 bits | Multicast group backoff end |
|   TLV encoded information | variable | TLV specific |
| } | | |

For each group, the contention resolution parameter fields 403, 405 include backoff start and end values. Their representation, in one embodiment, can be identical to the format of the backoff start/end values in a uplink channel descriptor (UCD) message. The multicast group CID can be carried in a TLV part (corresponding to the structure of a MCA-REQ message). The TLV section 407 and 409 also allows for the addition of other elements (or fields). When an SS receives the message structure 400, the SS 101 processes all the multicast groups stored in the message and updates the contention resolution parameters from the group(s) it belongs to. As described previously, the BS 103 can determine whether to send the configuration information for all the groups it is aware of or only for those ones for which the configuration has changed.

According to various embodiments, the message 400 can be communicated to SSs 101 in a variety of ways. One approach is to introduce a new management message: multicast assignment message configuration (MCA-CFG). In another embodiment, this structure 400 can be specified as a TLV element of the UCD message.

It is noted that the system of FIG. 1 can provide for backward compatibility. For example, if an SS 101 does not receive the configuration for the multicast group it belongs to, then the SS 101 can use common request backoff parameters announced in a UCD message. If an SS 101, which does not support the proposed multicast polling extension, receives an unknown MCA-CFG message or encounters an unknown TLV entry in the UCD message, the SS 101 can simply ignore such information.

Figure 5:
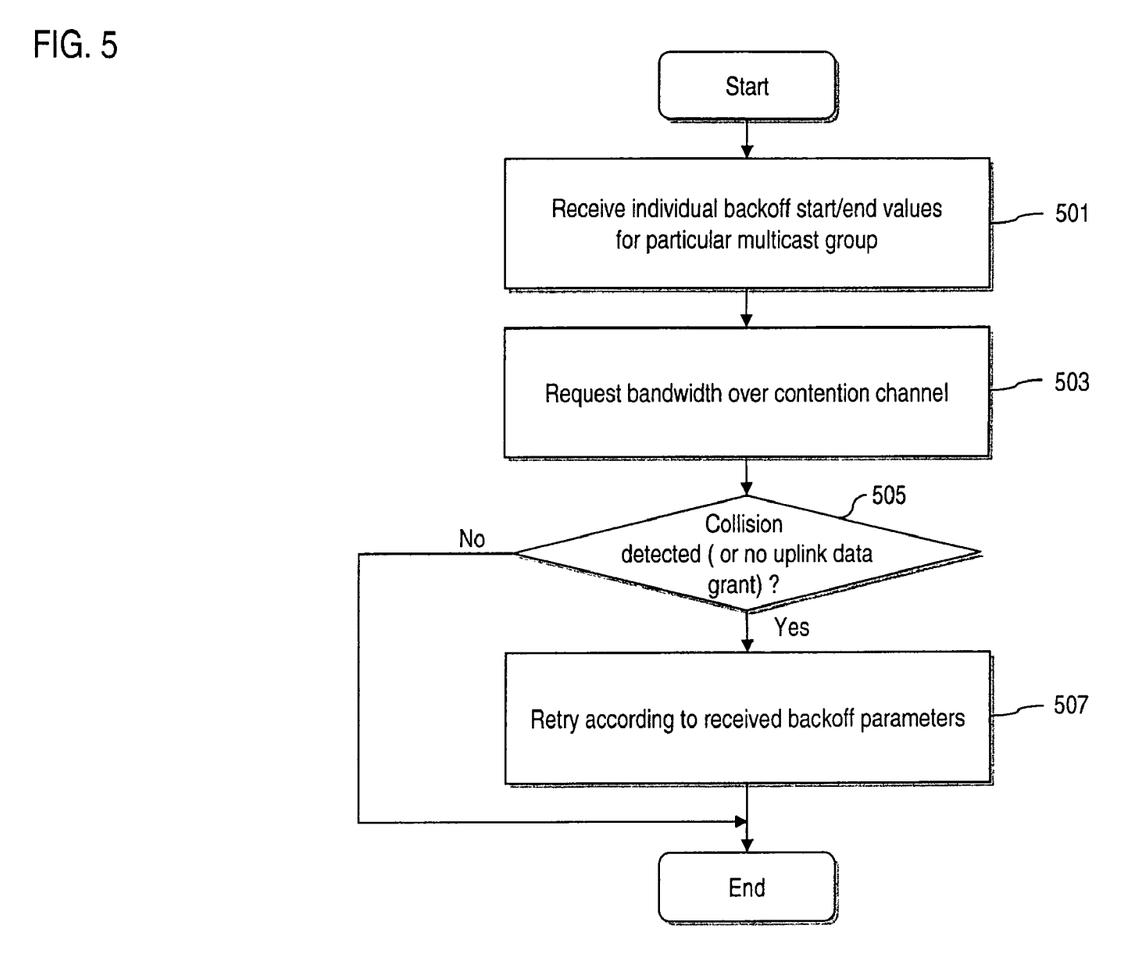
FIG. 5 is a flowchart of a multicast contention resolution process, according to an exemplary embodiment.

The multicast contention resolution procedure is further detailed in FIG. 5 from the perspective of the SS 101.

FIG. 5 is a flowchart of a multicast contention resolution process, according to an exemplary embodiment. In step 501, a SS 101, which is a member of a particular multicast polling group, receives contention resolution parameters designated for that particular group. This information is used by the SS 101 to request network resources (e.g., bandwidth) over the contention channel, per step 503. The SS 101 then listens to the channel to determine whether a collision has occurred (step 505); alternatively (as in the case of WiMAX), no uplink data grant is received. If there is a collision (or no uplink data grant), the SS 101 retries using the received contention resolution parameters, per step 507.

The processes of FIGS. 2 and 5 permit the BS 103 to provide a finer control over the contention resolution process when the multicast polling is in effect.

One of ordinary skill in the art would recognize that the processes for providing multicast contention resolution may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 6:
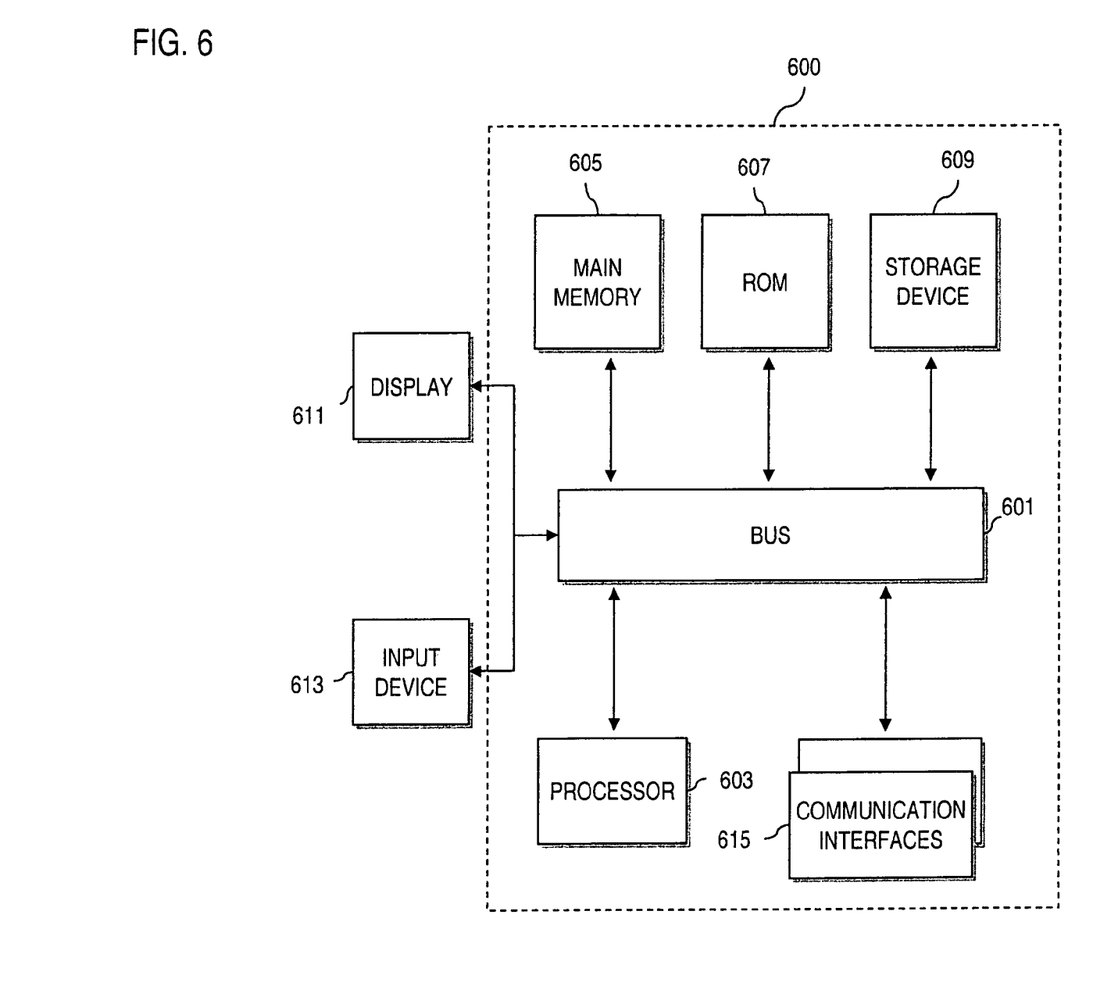
FIG. 6 is a diagram of hardware that can be used to implement an embodiment of the invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7A:
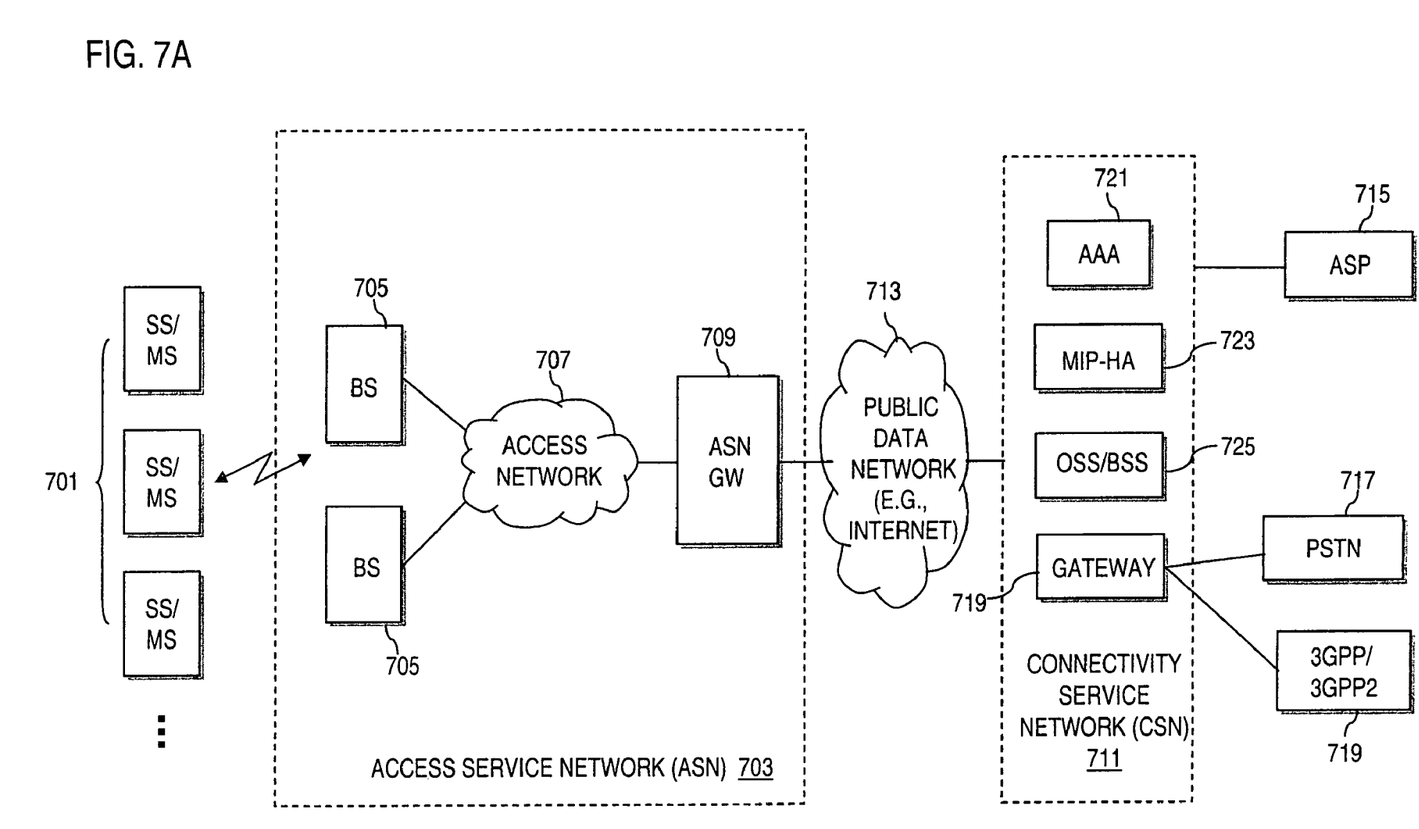
FIGS. 7A and 7B are diagrams of an architecture capable of supporting various embodiments of the invention.
Figure 7B:
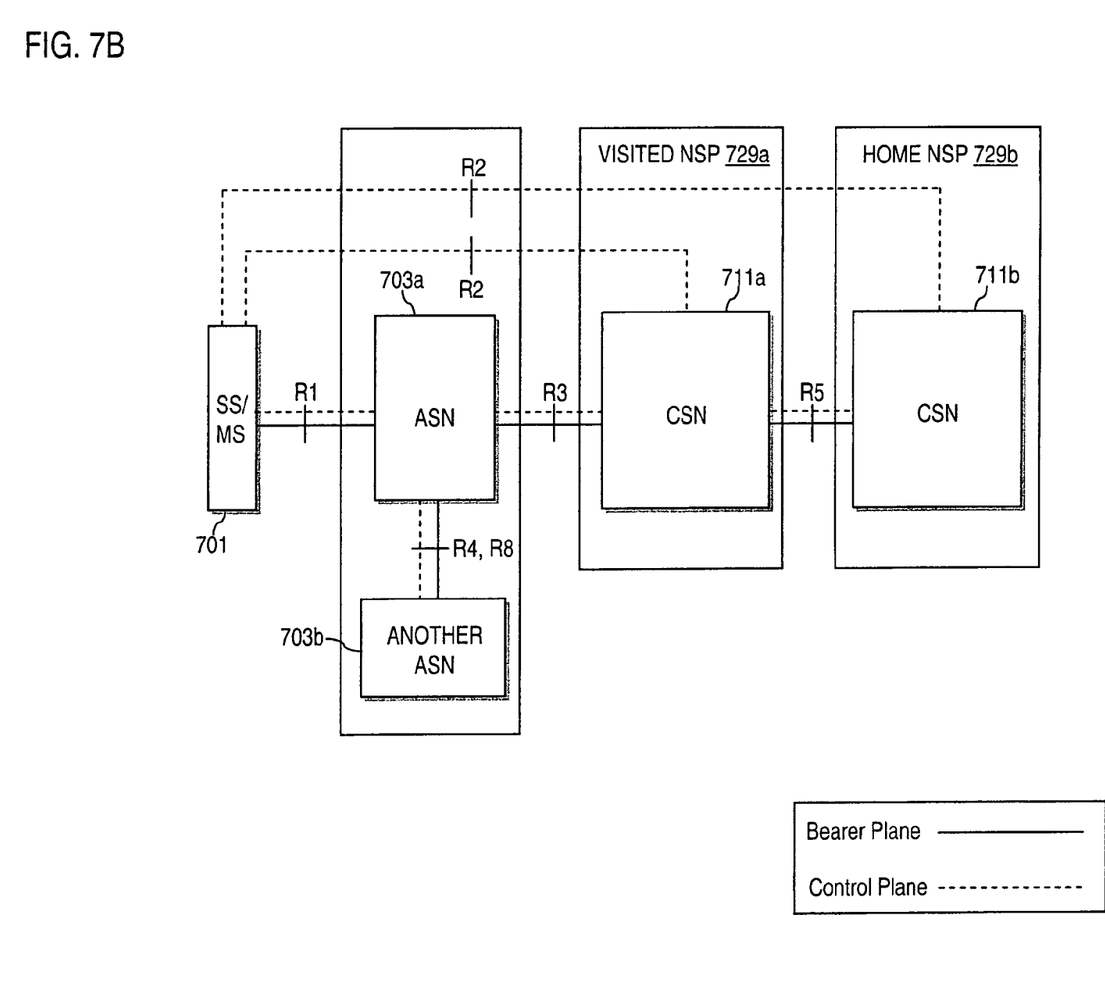

FIGS. 7A and 7B are diagrams of an exemplary WiMAX architecture, in which the system of FIG. 1 can operate, according to various exemplary embodiments of the invention. The architecture shown in FIGS. 7A and 7B can support fixed, nomadic, and mobile deployments and be based on an IP service model.

Subscriber or mobile stations 701 can communicate with an access service network (ASN) 703, which includes one or more base stations 705. In this exemplary system, the BS 103, in addition to providing the air interface to the MS 101, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 705 has connectivity to an access network 707. The access network 707 utilizes an ASN gateway 709 to access a connectivity service network (CSN) 711 over, for example, a data network 713. By way of example, the network 713 can be a public data network, such as the global Internet.

The ASN gateway 709 provides a Layer 2 traffic aggregation point within the ASN 703. The ASN gateway 709 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 711.

The CSN 711 interfaces with various systems, such as application service provider (ASP) 715, a public switched telephone network (PSTN) 717, and a Third Generation Partnership Project (3GPP)/3GPP2 system 719, and enterprise networks (not shown).

The CSN 711 can include the following components: Access, Authorization and Accounting system (AAA) 721, a mobile IP-Home Agent (MIP-HA) 723, an operation support system (OSS)/business support system (BSS) 725, and a gateway 727. The AAA system 721, which can be implemented as one or more servers, provide support authentication for the devices, users, and specific services. The CSN 711 also provides per user policy management of QoS and security, as well as IP address management, support for roaming between different network service providers (NSPs), location management among ASNs.

FIG. 7B shows a reference architecture that defines interfaces (i.e., reference points) between functional entities capable of supporting various embodiments of the invention. The WiMAX network reference model defines reference points: R1, R2, R3, R4, and R5. R1 is defined between the MS 101 and the ASN 703*a*; this interface, in addition to the air interface, includes protocols in the management plane. R2 is provided between the MS 101 and an CSN (e.g., CSN 711*a* and 711*b*) for authentication, service authorization, IP configuration, and mobility management. The ASN 703*a* and CSN 711*a* communicate over R3, which supports policy enforcement and mobility management.

R4 is defined between ASNs 703*a* and 703*b* to support inter-ASN mobility. R5 is defined to support roaming across multiple NSPs (e.g., visited NSP 729*a* and home NSP 729*b*).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   creating, by a processor, a plurality of multicast groups of terminals for providing contention resolution for resources of a network;
   determining, by the processor, individual contention resolution parameters for respective multicast groups of terminals, wherein the corresponding terminals within each of the multicast groups is configured to perform contention resolution over a contention channel based on the respective individual contention resolution parameters;
   initiating transmission, by the processor, the individual contention resolution parameters to the terminals of the respective multicast groups; and
   determining, by the processor, whether the determined individual contention resolution parameters have changed from previously determined individual contention resolution parameters, wherein only changed ones of the individual contention resolution parameters are transmitted.

2. A method according to claim 1, further comprising:
   determining number of connections within each one of the multicast groups, wherein the contention resolution parameters are determined based on the determined number of connections.

3. A method according to claim 1, wherein multicast group connection identifiers are utilized to transmit the individual contention resolution parameters to the terminals.

4. A method according to claim 1, wherein the individual contention resolution parameters are broadcast to the terminals.

5. A method according to claim 1, wherein the contention resolution parameters includes a backoff start value, a backoff end value, and number of request transmission opportunities of the contention channel.

6. A method according to claim 1, wherein the network is compliant with a Worldwide Interoperability for Microwave Access (WiMAX) architecture.

7. An apparatus comprising:
   a processor configured to create a plurality of multicast groups of terminals for providing contention resolution for resources of a network,
   wherein the processor is further configured to determine individual contention resolution parameters for respective multicast groups of terminals, the corresponding terminals within each of the multicast groups being configured to perform contention resolution over a contention channel based on the respective individual contention resolution parameters; and
   a transceiver configured to transmit the individual contention resolution parameters to the terminals of the respective multicast groups, wherein the processor is further configured to determine whether the determined individual contention resolution parameters have changed from previously determined individual contention resolution parameters, wherein only changed ones of the individual contention resolution parameters are transmitted.

8. An apparatus according to claim 7, wherein the processor is further configured to determine number of connections within each one of the multicast groups, and the contention resolution parameters are determined based on the determined number of connections.

9. An apparatus according to claim 7, wherein multicast group connection identifiers are utilized to transmit the individual contention resolution parameters to the terminals.

10. An apparatus according to claim 9, wherein the individual contention resolution parameters are broadcast to the terminals.

11. An apparatus according to claim 7, wherein the contention resolution parameters includes a backoff start value, a backoff end value, and number of request transmission opportunities of the contention channel.

12. An apparatus according to claim 7, wherein the network is compliant with a Worldwide Interoperability for Microwave Access (WiMAX) architecture.

13. An apparatus according to claim 7, wherein the apparatus is a base station.

* * * * *